(12) United States Patent
Shelton

(10) Patent No.: US 7,222,433 B2
(45) Date of Patent: May 29, 2007

(54) ELECTROMAGNETIC INCLINOMETER

(75) Inventor: Christopher Shelton, London (GB)

(73) Assignee: Autonnic Research, Inc., Essex (GB)

( * ) Notice: Subject to any disclaimer, the term of this patent is extended or adjusted under 35 U.S.C. 154(b) by 0 days.

(21) Appl. No.: 10/505,736

(22) PCT Filed: Jan. 23, 2002

(86) PCT No.: PCT/GB03/00302

§ 371 (c)(1),
(2), (4) Date: Aug. 24, 2004

(87) PCT Pub. No.: WO03/062748

PCT Pub. Date: Jul. 31, 2003

(65) Prior Publication Data

US 2005/0252015 A1    Nov. 17, 2005

(30) Foreign Application Priority Data

Jan. 23, 2002    (GB) .................... 0201502.2

(51) Int. Cl.
*G01C 9/20* (2006.01)
(52) U.S. Cl. .................... 33/366.17; 33/366.15
(58) Field of Classification Search ............... 33/365, 33/366.11, 366.12, 366.14, 366.17, 366.18, 33/366.25, 352, 355 R, 361
See application file for complete search history.

(56) References Cited

U.S. PATENT DOCUMENTS

| | | | | |
|---|---|---|---|---|
| 2,260,396 A | * | 10/1941 | Otto, Jr. ........................ 33/315 |
| 3,596,365 A | * | 8/1971 | Verhagen ................. 33/366.18 |
| 3,937,078 A | * | 2/1976 | Williams ................. 73/170.15 |
| 4,157,619 A | * | 6/1979 | Zuvela ........................ 33/352 |
| 4,517,750 A | * | 5/1985 | Netzer ......................... 33/396 |
| 4,614,041 A | * | 9/1986 | Darton et al. ................. 33/396 |
| 4,667,414 A | * | 5/1987 | Russell ........................ 33/364 |
| 4,791,730 A | * | 12/1988 | Gill ............................. 33/361 |
| 5,282,318 A | * | 2/1994 | Steiner ..................... 33/355 R |
| 5,452,520 A | * | 9/1995 | Raj et al. ................. 33/366.18 |
| 5,780,741 A | * | 7/1998 | Raj ......................... 73/514.08 |
| 6,301,795 B1 | * | 10/2001 | Kang ..................... 33/366.12 |

FOREIGN PATENT DOCUMENTS

| | | | |
|---|---|---|---|
| DE | 4001657 A1 | * | 7/1991 |
| JP | 56155808 A | * | 12/1981 |
| JP | 63128221 A | * | 5/1988 |
| JP | 2004045190 A | * | 2/2004 |

* cited by examiner

*Primary Examiner*—R. Alexander Smith
(74) *Attorney, Agent, or Firm*—John Wiley Horton

(57) ABSTRACT

An angle sensor comprising a housing (1) having horizontal and vertical axes, which housing is adapted to receive a magnetic core (5) such that the core remains in substantially the same plane, e.g. by floating on a liquid (4). The core is provided with two orthogonal windings (8,18). In use, an electric field is applied across the vertical axis of the housing, which electric field induces a voltage in the windings, wherein the magnitude of the induced field is dependent on the angle of the magnetic core to the horizontal winding.

8 Claims, 2 Drawing Sheets

ELECTROMAGNETIC INCLINOMETER

CROSS-REFERENCES TO RELATED APPLICATIONS

This application is a U.S. National Stage application filed pursuant to 35 U.S.C. §371. Pursuant to the cited section and the Patent Cooperation Treaty, priority is claimed to International Application No. PCT/GB 03/00302 having a priority date of Jan. 23, 2002.

STATEMENT REGARDING FEDERALLY SPONSORED RESEARCH OR DEVELOPMENT

Not applicable.

MICROFICHE APPENDIX

Not applicable.

BACKGROUND OF THE INVENTION

1. Background—Field of the Invention

The invention relates to an electromagnetic inclinometer and a method for measuring inclination using said inclinometer.

2. Background—Prior Art

There are many types of inclinometer available on the market for use in a wide variety of applications such as aircraft, geodetic engineering and general land surveying.

U.S. Pat. No. 4,15,7619 discloses an inclinometer for use in measuring water flow rates comprising a coil energised to produce a magnetic field extending along a normally vertical axis of the device and a flux gate assembly adapted to respond to a horizontal component of that field upon tilting movement of the axis to a inclined non-vertical position. The output will vary in response to change in inclination The flux gate assembly consists of a gimballed arrangement, which is held in an oil filled cavity in which the oil serves to damp the motion of the gimballed arrangement. This arrangement is very robust being adapted to work at oil well formation temperatures but is inevitably quite complex and unsuitable for many applications.

Another application of inclinometers is in marine applications, where they are used as a control device in satellite based navigation systems. Such inclinometers may be fluid based or solid state devices. The fluid devices typically comprise a small bulb having an electrolyte and a plurality of substantially similar electrodes. As the inclinometer is tilted, the fluid will remain level due to the effect of the Earth's gravitational field but the depth to which the electrodes are in contact with the electrolyte changes. This produces a measurable change in the conductance or capacitance between the electrodes, which can be used to calculate the inclination present.

These devices haven proven in the field to be simple and rugged but suffer a number of drawbacks. In particular, they can be slow to recover from shocks as the fluid will be shaken up and give false readings due to the presence of air bubbles and there is tendency for the electrolyte to lose conductivity over time due to electrolysis.

BRIEF SUMMARY OF THE INVENTION

The present invention seeks to provide an electromagnetic inclinometer that is both simple and rugged and yet avoids the problems inherent in electrolytic sensors.

According to a first aspect of the invention there is provided an electromagnetic inclinometer comprising a housing having horizontal and vertical axes, which container adapted to receive a fluid and a magnetic core adapted to float on or in said fluid thereby remaining substantially in the same plane, wherein the core is provided with two orthogonal windings, wherein, in use, an electric field is applied across the vertical axis of the housing, which electric field induces a voltage in the windings in dependence on the angle of the core to the horizontal axis of the housing.

According to a second aspect of the invention, there is provided a method of measuring tilt comprising the step of applying an electric field across the vertical axis of a housing a housing having horizontal and vertical axes, which container adapted to receive a fluid and a magnetic core such that the core floats on or in said fluid thereby remaining substantially in the same plane, the core being provided with two orthogonal windings, wherein the electric field induces a voltage in the windings in dependence on the angle of the core to the horizontal axis of the housing, the voltage being measured to provide the tilt.

According to a further aspect of the invention there is provided a joystick comprising an angle sensor comprising a housing having horizontal and vertical axes, which housing is adapted to receive a magnetic core such that the core remains in substantially the same plane, wherein the core is provided with two orthogonal windings, characterised in that, in use, an electric field is applied across the vertical axis of the housing, which electric field induces a voltage in the windings, wherein the magnitude of the induced field is dependent on the angle of the magnetic core to the horizontal winding, wherein the sensor further comprises a permanent magnet having one end being position fixed manner such that the magnet is permitted to tilt and rotate, wherein in use, an electric field is applied across the vertical axis of the housing, which electric field induces a voltage in the windings, the magnitude of which is dependent on the angle of the permanent magnet to the horizontal axis of the device.

Preferably, the electric field is alternating so that the phase of the voltage induced in the windings provides the direction of the tilt and the magnitude of the voltage provides the amount of tilt.

Alternatively, the core may be provided with a toroidal winding, which toroidal winding is adapted to saturate the core, from time to time so as to cause a change in the amount of the 'vertical' field which threads the sense winding. In this case the induced voltage occurs when the core is enters and leaves saturation. The magnitude of the field is such that it is much greater than the earths field which can then be ignored.

Preferably, the device may be constructed inside a box adapted to eliminate the earth's field.

The use of floating cores is known from other applications such as flux gate compasses (see U.S. Pat. No. 5,282,318 for example), in which the core floats so that it remains horizontal, thereby ensuring that only the horizontal component of the Earth's magnetic field is measured. By floating the core the voltage induced in the sense windings are the same regardless of the inclination of the compass device, thereby eliminating tilt. However, in the invention, the horizontal component of the Earth's magnetic field is eliminated in favour of a field fixed with respect to the housing.

Exemplary embodiments of the invention will now be described in greater detail.

REFERENCE NUMERALS IN THE DRAWINGS

| | | | |
|---|---|---|---|
| 1 | annular housing | 2 | annular flange |
| 3 | central opening | 4 | liquid |
| 5 | magnetic core | 6 | toroidal winding |
| 7 | toroidal winding | 8 | sense winding |
| 9 | pin | 16 | toroidal winding |
| 17 | toroidal winding | 18 | sense winding |
| 20 | cylindrical housing | 21 | spheroidal indentation |
| 22 | elongated permanent magnet | | |

DETAILED DESCRIPTION

Figure 1:
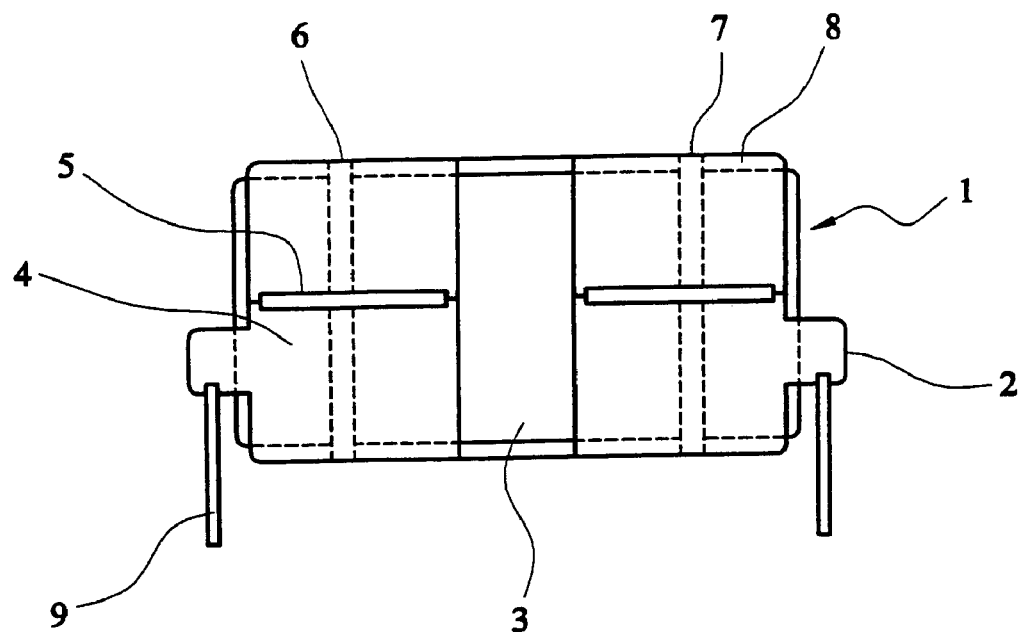
FIG. 1 shows a cross section of an inclinometer.

FIG. 1 shows a cross section of an inclinometer comprising a substantially cylindrical annular housing 1 having an annular flange 2 situated towards the lower portion of the housing 1. The housing 1 has a central opening 3 and grooves in the surface of the housing adapted to receive windings.

The housing 1 is about half full with a liquid 4. A magnetic core 5, is attached to a float, the core also having an annular form, so that the core floats on the liquid. The magnetic core 5 is keyed to substantially prevent any rotation in the housing 1.

Toroidal windings 6,7 are shown in dashed lines, which are wrapped around the housing and hence the core passing through the annular opening in the housing 1. A further sense winding 8 is provided which is wrapped around the housing 1 but does not pass through the annular opening.

The flange 2 is provided with mounting points for a plurality of pins 9, wherein the sense winding 8 is connected to a pin 9 to provide the electrical contact to the measuring equipment (not shown).

Figure 2:
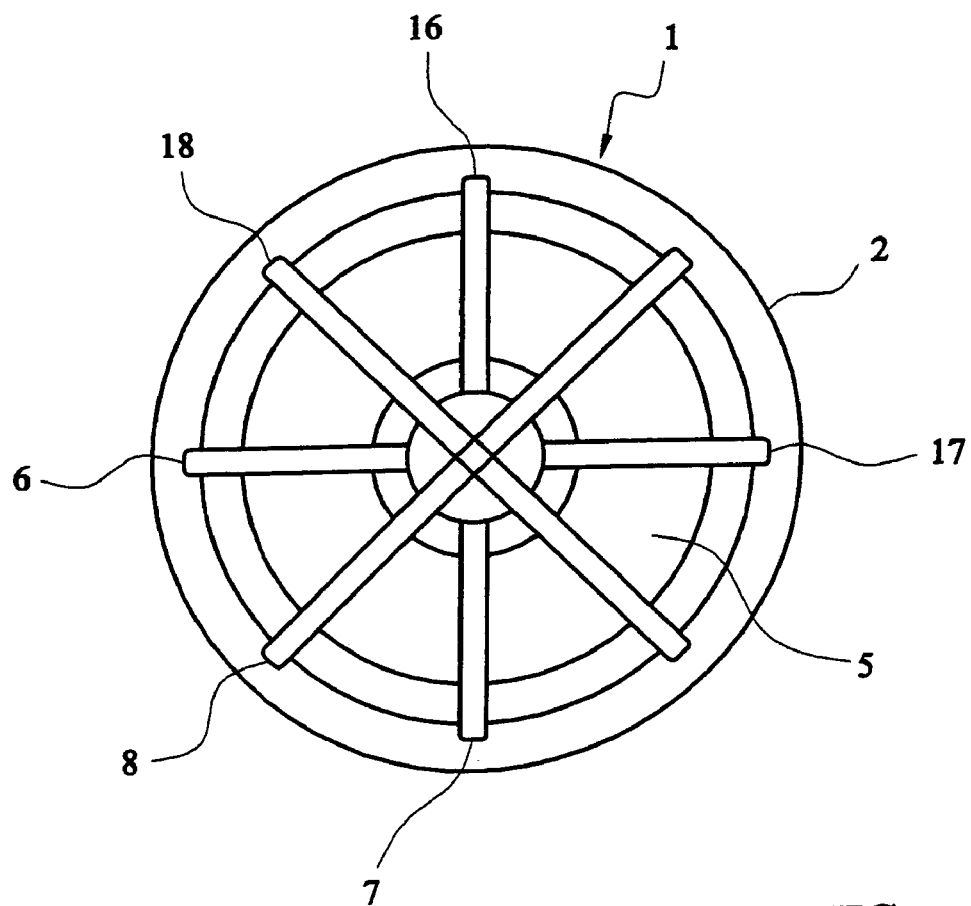
FIG. 2 shows a plan view of the inclinometer.

FIG. 2 shows a plan view of the same device with the annular housing 1, flange 2, magnetic core 5 and liquid 4. This view shows the four equidistant toroidal windings 6,7, 16,17 and also the two orthogonal sense windings 8, 18. The sense windings 8, 18 permit the displacement of the field relative to horizontal to be resolved in two axes.

Although this embodiment of the invention is based on a floating core device, the field it measures is not fixed to the earth but fixed to the device. Thus when the device is tilted the field is tilted too. In this way, the floating core instead of eliminating the effect of tilt, causes only tilt to be sensed because the position of the core is kept in the same plane as the surface of the earth, by gravity. In the invention the core is fixed to the earth but the field is fixed to the device. This is done in such a way that it would be regarded as having no horizontal component—only a vertical component; furthermore, vertical in this meaning is vertical to the device and fixed with respect to the device. Thus, when the device is horizontal, the core is horizontal and the field is vertical and so no part of the field threads the sense winding. When the device is tilted, the field is also tilted because the field is fixed to the device. But the core remains horizontal and therefore no longer normal to the field. Therefore some part of the field is now made to thread the sense winding; increasing the tilt causes more field to thread the sense winding.

Those skilled in the art will understand that each sense winding is in the form of a loop lying more or less in a plane. When the device is not tilted, the field is oriented in the same plane as the loop. Thus, no voltage is created in the loop. Once the core is tilted, however, the field passes through the loop ("threads" the loop), thereby inducing a voltage. Two orthogonal sense windings are provided so that the voltage in each sense winding can be evaluated to determine the direction and magnitude of the tilt.

The toroidal winding around the core is adapted to saturate the core from time to time so as to cause a change in the amount of the 'vertical' field which threads the sense winding. In this case the induced voltage occurs when the core enters and leaves saturation.

In an alternative embodiment, the housing may be constructed without the central opening 3, so that the housing is substantially cylindrical. For such a housing, it would be possible to dispense with the toriodal windings and use an alternating field so as to cause a voltage to appear on the sense winding. The phase of the induced voltage will give the direction of the tilt and the magnitude the amount of tilt. In the case of a device constructed without the opening 3, measurement can continue to 90° and then beyond when the device will be upside down This rolling can be measured.

The magnitude of the field is such that it is much greater than the earths field which can then be ignored, or else the device is constructed inside a box which eliminates the Earth's field.

Figure 3:
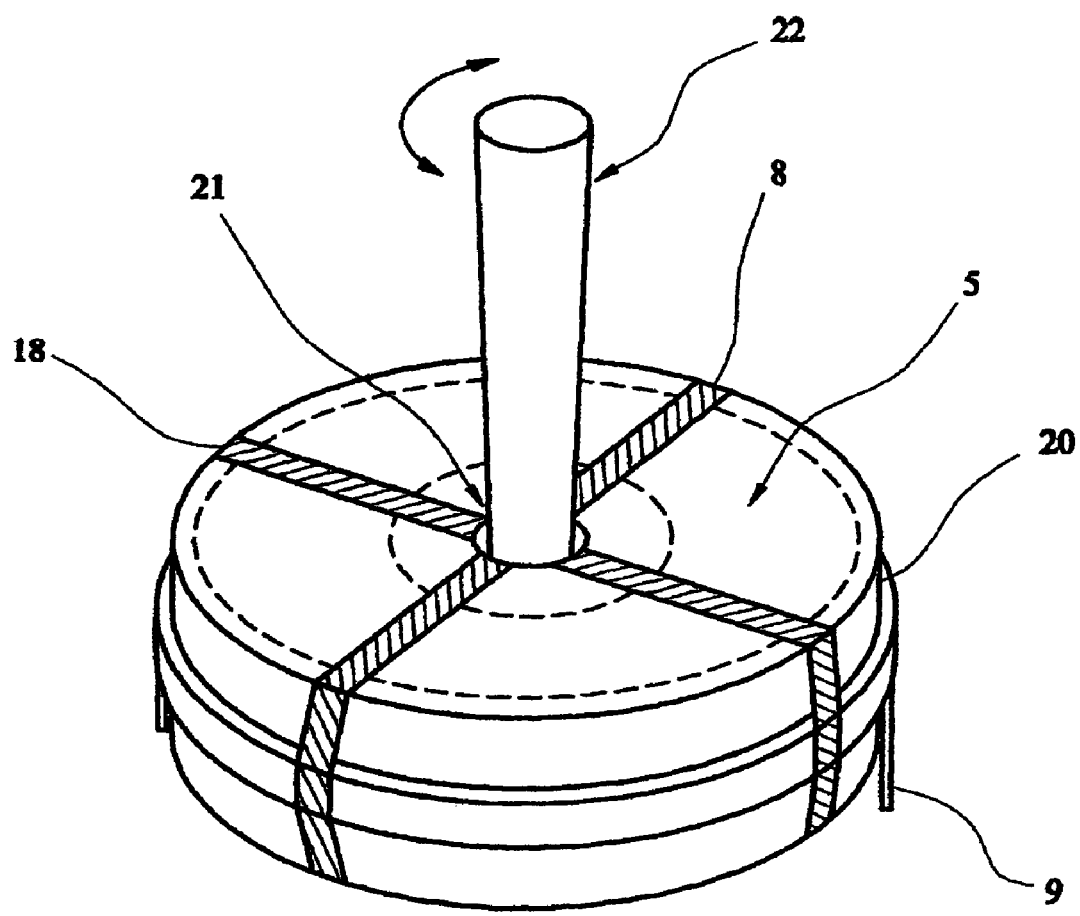
FIG. 3 shows a schematic of a joystick.

FIG. 3 shows a further embodiment of the invention in which the device is to be incorporated in a joystick In this case the joystick assembly comprises a cylindrical housing 20 having a spheroidal indentation 21 on its upper end surface. A magnetic core 5 is held in the housing. In contrast to the embodiment described with respect to FIGS. 1 and 2, the core is substantially fixed in position and the housing is not half filled with liquid. However, two orthogonal sense windings 8, 18 are provided. The sense windings are provided with an electrical contact pin 9 to provide the contact to measuring equipment.

A elongated permanent magnet 22 is movably mounted in the spheroidal indentation 21 such that it is free to rotate in the mounting to provide the appropriate tilt required of the joystick. An alternating field is applied to the sense windings 8,18 so that movement of the permanent magnet induces a voltage change in the sense windings. In this case, the phase of the induced voltage will give the direction of the tilt and the magnitude the amount of tilt of the permanent magnet. The device is suitable for incorporation in a joystick, in which the permanent magnet will be covered to provide the joystick and the housing mounted in the joystick support. The joystick again utilises the concept of the invention of using a flux gate to measure the angle of a magnet with respect to the vertical axis of the device rather than the Earth's magnetic field to measure tilt. Although the joystick is described as being based on a device without a floating core, it would also be possible to use a floating core.

The invention claimed is:

1. An electromagnetic inclinometer comprising a housing having horizontal and vertical axes, said housing being adapted to receive a fluid and a magnetic core adapted to float on or in said fluid, thereby remaining substantially in the same plane as the surface of the earth wherein said housing is provided with two orthogonal sense windings, characterised in that in use, a magnetic field is applied along said vertical axis of said housing such that said magnetic field is fixed with respect to said inclinometer, which field induces a voltage in said sense windings in dependence on the angle of said magnetic core to said horizontal axis of said housing, thereby providing an indication of tilt.

2. An electromagnetic inclinometer as recited in claim 1, wherein said magnetic field applied along said vertical axis of said housing is alternating so the phase of said voltage induced in said sense windings provides an indication of the direction of the tilt and the magnitude of said voltage induced in said sense windings provides an indication of the amount of tilt.

3. An electromagnetic inclinometer as recited in claim 2, wherein said magnetic core is adapted to float on said fluid by being attached to a float.

4. An electromagnetic inclinometer as recited in claim 1, wherein said magnetic field applied along said vertical axis of said housing is created by a toroidal winding passing around said housing, which toroidal winding is adapted to saturate said magnetic core, from time to time, so as to cause a change in the amount of said vertical field which threads said sense windings.

5. An electromagnetic inclinometer as recited in claim 4, wherein said inclinometer is shielded from the earth's magnetic field.

6. An electromagnetic inclinometer as recited in claim 5, wherein said magnetic core is adapted to float on said fluid by being attached to a float.

7. An electromagnetic inclinometer as recited in claim 4, wherein said magnetic core is adapted to float on said fluid by being attached to a float.

8. An electromagnetic inclinometer as recited in claim 1, wherein said magnetic core is adapted to float on said fluid by being attached to a float.

* * * * *